United States Patent

Tareev

[19]

[11] Patent Number: 6,147,680
[45] Date of Patent: Nov. 14, 2000

[54] TOUCHPAD WITH INTERLEAVED TRACES

[75] Inventor: Aleksey A. Tareev, Ulyanovsk, Russian Federation

[73] Assignee: KOA T&T Corporation, Nagano, Japan

[21] Appl. No.: 08/868,983

[22] Filed: Jun. 3, 1997

[51] Int. Cl.⁷ ...................................................... G09G 5/00
[52] U.S. Cl. ........................................ 345/173; 178/18.01
[58] Field of Search .................................... 345/173–178, 345/156, 157; 178/FOR 103, 18.01, 18.03, 18.06, 19.01, 19.03, 20.01

[56] References Cited

U.S. PATENT DOCUMENTS

| | | |
|---|---|---|
| 3,921,166 | 11/1975 | Volpe . |
| 4,103,252 | 7/1978 | Bobick . |
| 4,455,452 | 6/1984 | Schuyler . |
| 4,550,221 | 10/1985 | Mabusth . |
| 4,639,720 | 1/1987 | Rympalski et al. . |
| 4,686,332 | 8/1987 | Greanias et al. . |
| 4,733,222 | 3/1988 | Evans ...................................... 340/365 |
| 4,736,191 | 4/1988 | Matzke et al. . |
| 5,016,008 | 5/1991 | Gruaz et al. . |
| 5,543,588 | 8/1996 | Bisset et al. ............................. 178/18 |
| 5,543,589 | 8/1996 | Buchana et al. ......................... 178/18 |
| 5,818,315 | 10/1998 | Moongilan ............................ 333/238 |

FOREIGN PATENT DOCUMENTS

WO 91/03039  3/1991  WIPO .

OTHER PUBLICATIONS

Synaptics Brochure, "Synaptics Touch Pad," pp. 1–39.

*Primary Examiner*—Amare Mengistu
*Assistant Examiner*—Jimmy Hai Nguyen
*Attorney, Agent, or Firm*—Townsend and Townsend and Crew LLP

[57] ABSTRACT

A unique layout with a matrix of traces having at least traces in one direction provided with portions which are interleaved with portions of adjacent traces. Unlike the prior art zigzag pattern, the extensions of the traces of the present invention are actually interleaved, so that they overlap with portions of the adjacent trace. Thus, a finger moving from one trace to the next will contact the interleaved portions of the adjacent trace before it leaves the interleaved portions of the first trace.

2 Claims, 6 Drawing Sheets

TOUCHPAD WITH INTERLEAVED TRACES

BACKGROUND OF THE INVENTION

The present invention relates generally to touchpad devices, and more particularly relates to trace layout in touchpads.

Touch sensing devices are well known, and take a number of different forms. Perhaps the best known are resistive-membrane position sensors, which have been used in a number of different applications for many years. Such devices have been used as keyboards, position indicators, and so forth. Other types of touch sensing devices include resistive tablets, surface acoustic wave devices, touch sensors based on strain gages or pressure sensors, and optical sensors.

Yet another touch sensing technology is capacitive sensing, in which the location of a finger (or in some instances another object such as a stylus) over a sensing device is determined by virtue of variations in capacitance under and around the location of the finger. Typical of capacitive touch sensing devices are touch screens and capacitive pads which employ a matrix of row and column electrodes and detect, for example, either the transcapacitance between row and column electrodes or the effective capacitance to virtual ground. Other capacitive techniques are also known. Some touch sensitive devices are known to use interpolation for more precisely identifying the location of a finger or stylus.

One problem with the array of rows and columns is that when a finger or stylus moves across the touchpad, the detected signal will have abrupt changes from one line to the next. For example, the finger or stylus may be entirely on one line, then moves across the space between the lines, then abruptly contacts the second line. One attempt to address this problem is in a touchpad in which the rows have a zigzag shape reassembling a series of triangles, one on top of the other. Thus, as the finger moves across, it may contact a tip of a triangle of the next trace before completely contacting the next trace, and before leaving the first trace. This provides more continuity and less of an abrupt change. Since the amount of signal detected is proportionate to the amount of the trace covered by the finger, this is initially a small amount as a tip of an extending triangle is contacted, and increases as the finger gets closer to and eventually covers the trace. A disadvantage of such a design is the zigzag pattern will still not provide a smooth signal depending on the direction of the finger.

For touchpads which determine a capacitance between the matrix and ground, the lower matrix, whether rows or columns, have a disadvantage since they are farther from the finger, and thus have less capacitance coupled into them. This will result in a smaller signal in one direction. One way of addressing this is to include "floating" pads in the upper array. Thus, a series of conductive regions which are not connected to anything are mounted above the corresponding traces of the lower layer to couple in more capacitance from the finger.

It would be desirable to have a trace pattern which is more effective in removing discontinuities.

SUMMARY OF THE INVENTION

The present invention provides a unique layout with a matrix of traces having at least traces in one direction provided with portions which are interleaved with portions of adjacent traces. Unlike the prior art zigzag pattern, the extensions of the traces of the present invention are actually interleaved, so that they overlap with portions of the adjacent trace. Thus, a finger moving from one trace to the next will contact the interleaved portions of the adjacent trace before it leaves the interleaved portions from the first trace.

In a preferred embodiment, the interleaved traces are substantially rectangular in form, and have thinner portions where they cross over an orthogonal trace from the next layer. This reduces the amount of undesirable capacitive coupling from the traces themselves, as opposed to desirable capacitive coupling from a finger.

In a preferred embodiment, the interleaved portions are packed closer to each other than the distance between the main part of the traces to improve the continuity as a finger is moved. This insures that an extension will be contacted before the next trace is reached no matter where along the trace the finger is.

Finally, the top layer preferably has floating regions above the conductive traces in the second layer, including above the interleaved portions. In a preferred embodiment, two adjacent floating rectangles are between each trace in the first layer. The two adjacent rectangles are separated because they will cover interleaved extensions from opposite traces in the second layer for every other pair of rectangles. The alternate rectangles which are above a single trace line are also separated in order to make a consistent, simplified layout.

For further understanding of the nature and advantages of the invention, reference should be made to the following description taken in conjunction with the accompanying drawings.

DESCRIPTION OF THE PREFERRED EMBODIMENT

Figure 1:
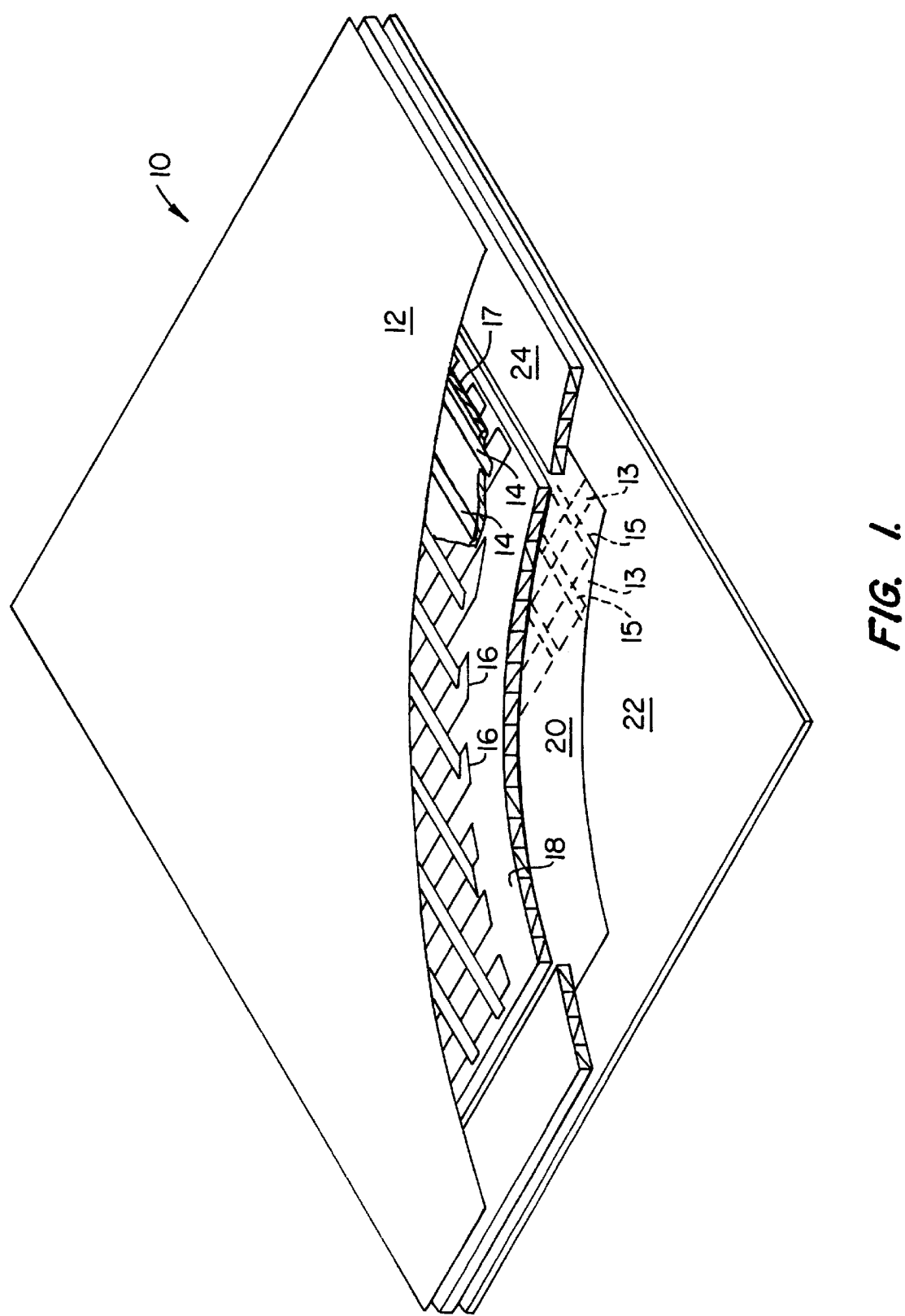
FIG. 1 is a partially broken away view of a touchpad illustrating the different layers.

FIG. 1 generally illustrates a touchpad 10 in accordance with the invention. The touchpad includes a top, protective insulating layer 12 upon which a finger or stylus will come into direct contact. Next are a series of traces 14 in a first layer of the trace matrix. Traces 16 form a second layer of the matrix in an orthogonal direction. In between traces 14 and 16 is an insulating layer 17. Another insulating layer 18 separates the matrix from a ground plane 20, which is mounted on the printed circuit board 22. The active area of the touchpad is mounted within a plastic border area 24.

Figure 2:
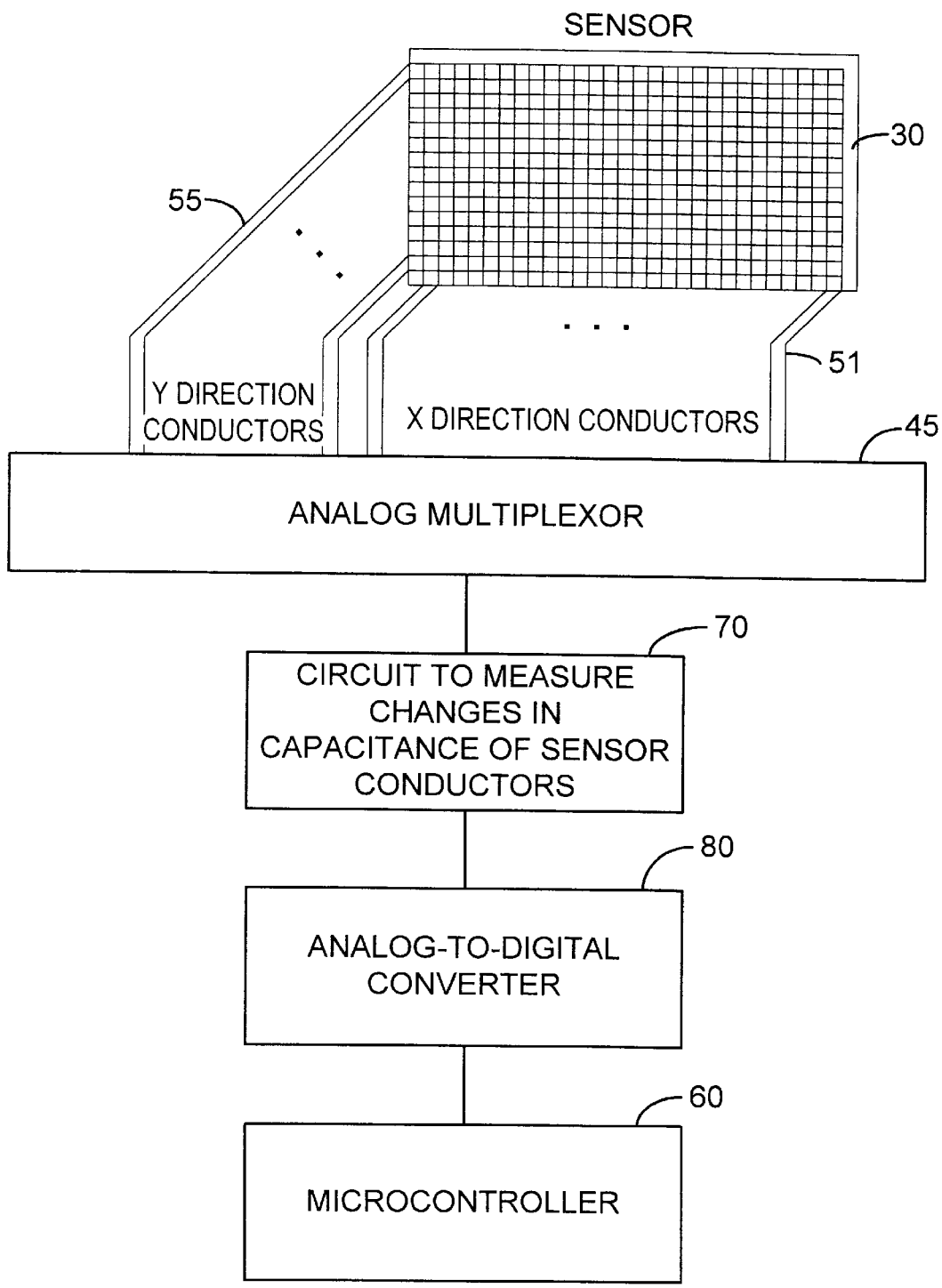
FIG. 2 is a block diagram of the electronics of a touchpad.

Referring next to FIG. 2, the operation of the touchpad 10 may be better appreciated. In particular, FIG. 2 shows in block diagram form the electronics implemented to form an exemplary touchpad 10 of FIG. 1. A touchpad matrix 30 is composed of a plurality of rows and columns of wires or traces arranged in a conventional manner; see U.S. patent application Ser. No. 08/321,987, filed Oct. 12, 1994, entitled Touch Pad Sensor with Simultaneous Sensing, commonly assigned with the present application. The rows and columns are connected to an analog multiplexer 45 through a plurality of X (row) direction conductors 51 and a plurality of Y (column) direction conductors 55, one conductor for each row and each column. Under the control of a microcontroller 60, the analog multiplexer 45 selects which traces of the matrix 30 will be sampled, and the output of those traces is then provided to a capacitance measuring circuit 70. One suitable capacitance measuring circuit is described in aforementioned U.S. patent application Ser. No. 08/321,987, commonly assigned with the present invention and incorporated herein by reference; another is described in U.S. patent application Ser. No. 08/478,290, filed Jun. 7, 1995, entitled Touch Sensing Method and Apparatus and also commonly assigned with the present invention and incorporated herein by reference.

The output of the capacitance measuring circuit is then provided to an analog to digital converter 80, which operates as described in either of the above-referenced patent applications to convert the capacitance values from the circuit 70 into a digital representation. The analog to digital converter 80 then supplies the signals to the microcontroller 60, which operates to form, among other things, a finger profile X-Y, cursor data, and control signals. Depending on the operation being performed at the particular time, the output of microcontroller 60 is then supplied to an interface to a PC or other device, such as a PS/2 interface, an RS-232 interface, or an Apple Desktop Bus (ADB).

Figure 3:
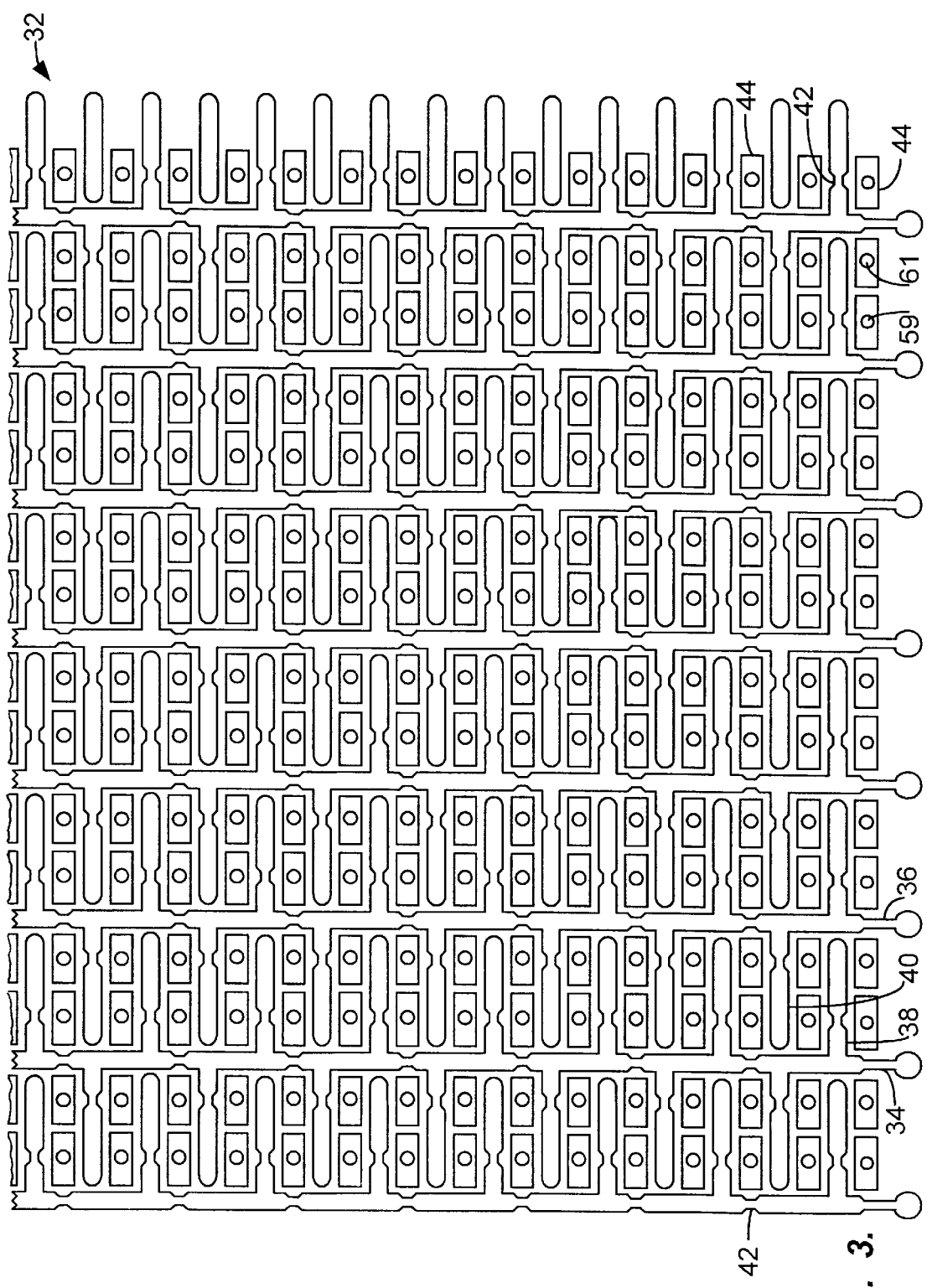
FIG. 3 is a diagram of the layout of a top matrix layer according to one embodiment of the invention.

FIG. 3 shows one embodiment of a top layer 32 according to the present invention. A number of vertical traces are provided, such as traces 34 and 36. These traces include interleaved portions, such as an extension 38 from trace 34, and an extension 40 from trace 36. As can be seen, these traces are interleaved, with extension 38 extending toward trace 36 sufficiently so that it is overlapping with extension 40. In addition, the distance between extensions 38 and 40 is less than the distance between traces 34 and 36.

As can be seen, if a finger was to move from left to right, it would first contact trace 34, and still be contacting extension 38 while it comes into contact with extension 40. The amount of trace 34 and its extensions being contacted by the finger will thus gradually decrease, while at the same time, the amount of extension 40 and eventually trace 36 itself covered by the finger will steadily increase. This provides a smoother transition as the finger is moved across the matrix.

In addition, the traces and extensions have a number of thinned areas, such as thinned areas 42. These thinned areas correspond to the portions of the traces in layer 32 which cross over traces in underlying layer 47 shown in FIG. 4. The thinned areas will reduce the undesirable capacitive coupling between the two portions of the matrix itself.

Figure 4:
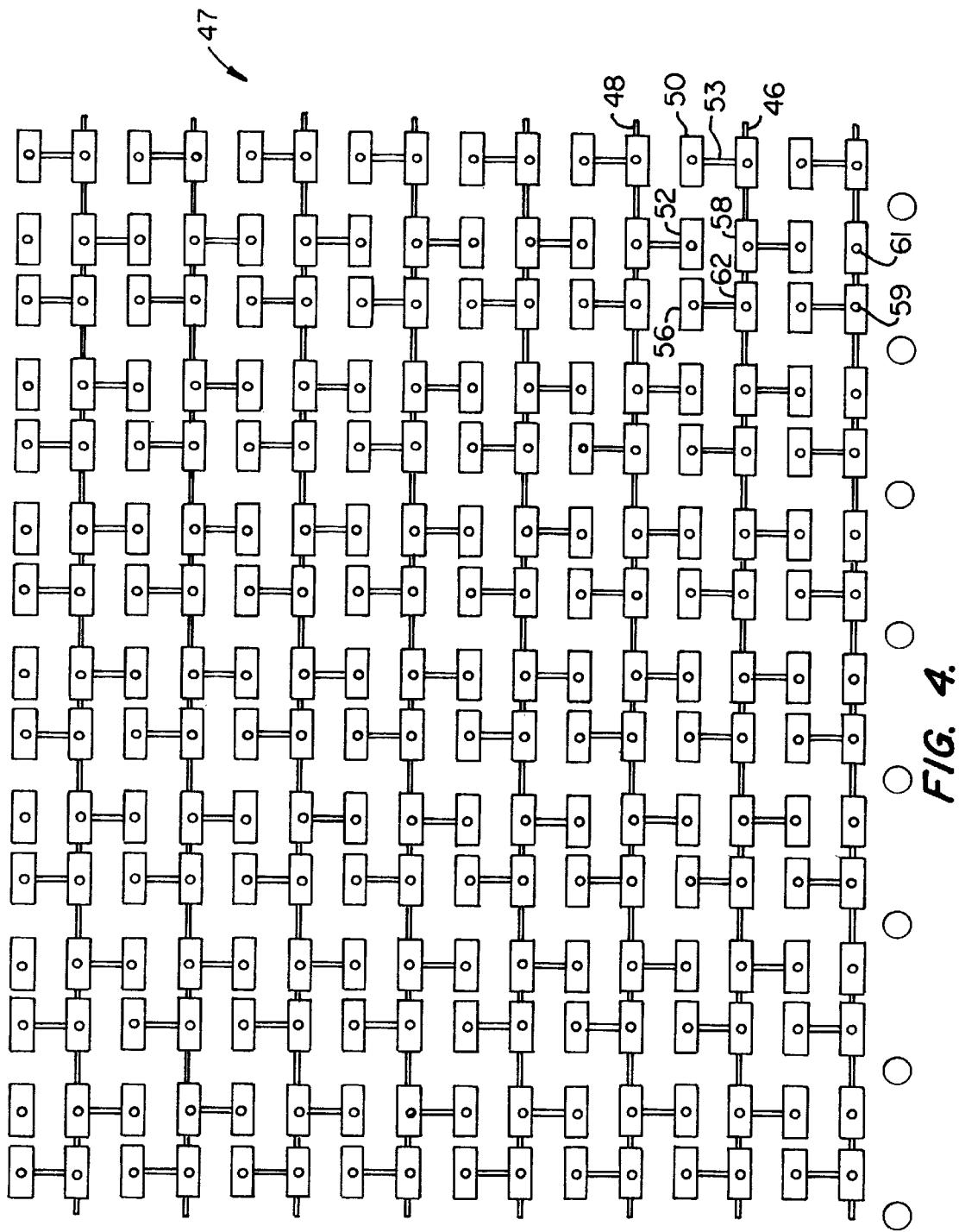
FIG. 4 is a diagram of a layout of the bottom matrix layer according to one embodiment of the invention.

FIG. 3 also shows a number of floating pads 44 which are directly above corresponding portions of lower layer 47 shown in FIG. 4.

Turning now to FIG. 4, lower layer 47 includes a number of horizontal traces, such as traces 46 and 48. Trace 46 has an interleaved extension 50, which overlaps with an interleaved extension 52 from trace 48. Note that extension 50 includes a thinned area 53 where it crosses under a trace in the upper layer 32 in FIG. 3.

Between the thinned portions, the traces are formed of a series of rectangular blocks. In addition, the interleaved portions themselves have rectangular blocks which are shaped to fit below the floating blocks of the upper layer, thereby increasing the capacitive coupling from the finger through the first layer. The reason for separating the pairs of floating blocks in FIG. 3 can be readily seen. For example, extension 52 has a rectangular block corresponding to one trace, while an adjacent block 56 corresponds to a different trace. Thus, the floating pads above should not be connected or they would couple into two adjacent traces. The floating blocks above portions 58 and 62 of trace 46 could be connected together in FIG. 3, but are not to make a consistent layout. In one alternate embodiment, the floating blocks are connected by vias 56 and 61 to the extending portions of the trace in the other layer. For example, a via 59 and 61 could connect the floating blocks above portions 58 and 62 to those portions of trace 46.

Figure 5:
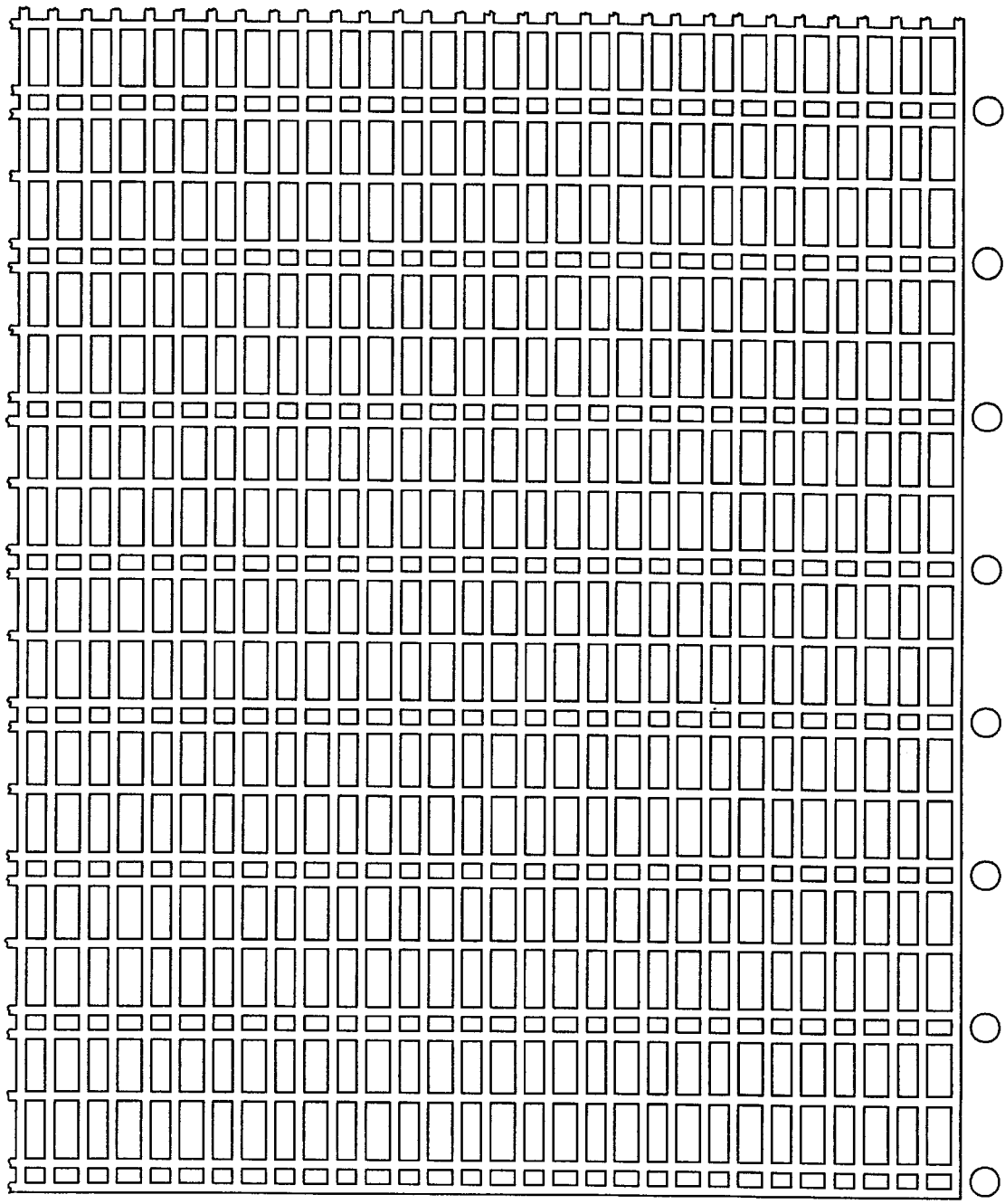
FIG. 5 is a diagram of a layout of a ground grid according to one embodiment of the invention.

The ground plane 20 of FIG. 1 can be either a continuous ground plane, or a grid of rows and columns 13 and 15. In one embodiment, the rows and columns of the ground plane grid are offset from the traces of the first and second layers, so that the grid lines are beneath and between the interleaved extensions and the floating regions. This should reduce the eigen value of capacitance between the traces and ground, and thus improve the sensitivity and noise stability of the touchpad. FIG. 5 is an example of a ground plane grid.

Figure 6A:
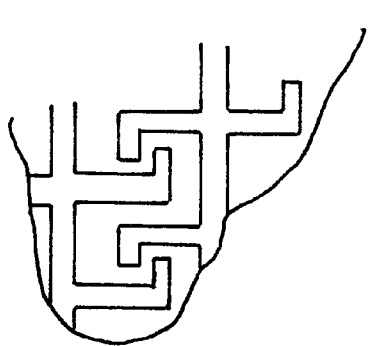
FIGS. 6A and 6B illustrate examples of alternate possible interleaved patterns.
Figure 6B:
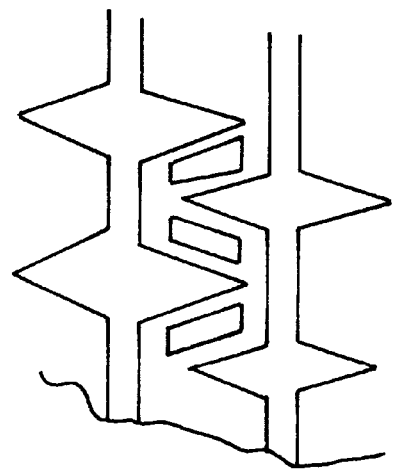

The examples in FIGS. 3 and 4 show a preferred embodiment of an interleaved trace pattern of the present invention. However, other interleaved patterns can be used. FIGS. 6A and 6B illustrate some examples of alternate interleaved, overlapping patterns. In both 6A and 6B embodiments, the extensions from the traces overlap, and the extensions are closer together than the main traces themselves.

As will be understood by those skilled in the art, the present invention may be embodied in other specific forms without departing from the spirit or essential characteristics thereof. For example, the capacitance between the two layers of the matrix could be measured, with the layout being made so that the portions are widest and cover each other where they do cross, as opposed to being thinner in those positions. The present invention may also be used with a touchpad operated with a stylus. Accordingly, the foregoing description is intended to be illustrative, but not limiting, of the scope of the invention which is set forth in the following claims.

What is claimed is:

1. A touchpad comprising:

an insulating layer;

a first layer mounted on a first side of said insulating layer and having a plurality of first traces extending in a first direction;

a second layer mounted on a second side of said insulating layer and having a plurality of second traces extending in a second direction, said second direction being substantially orthogonal to said first direction, said second traces having portions which are interleaved with portions of adjacent traces;

wherein said first traces have portions which are interleaved with portions of adjacent traces; and wherein said interleaved portions of said first traces are thinner at positions crossing over said interleaved portions of said second traces.

2. A touchpad comprising;

an insulating layer;

a first layer mounted on a first side of said insulating layer and having a plurality of first traces extending in a first direction, said first traces having portions which are interleaved with portions of adjacent traces;

a second layer mounted on a second side of said insulating layer and having a plurality of second traces extending in a second direction, said second direction being substantially orthogonal to said first direction, said second traces having portions which are interleaved with portions of adjacent traces;

wherein a distance between said interleaved portions is less than a distance between said second traces; and a plurality of isolated, floating conductive regions in said first layer positioned opposite portions of said interleaved portions of said second layer;

wherein said interleaved portions of said first traces are thinner at positions crossing over said interleaved portions of said second traces.

* * * * *